United States Patent [19]
Silver et al.

[11] Patent Number: 5,521,745
[45] Date of Patent: May 28, 1996

[54] ELECTROCHROMIC DEVICE

[75] Inventors: Jack Silver, London; Peter J. Lukes, Hampton Hill, both of England

[73] Assignee: British Technology Group Ltd., England

[21] Appl. No.: 140,064

[22] PCT Filed: Apr. 30, 1992

[86] PCT No.: PCT/GB92/00797

§ 371 Date: Jan. 24, 1994

§ 102(e) Date: Jan. 24, 1994

[87] PCT Pub. No.: WO92/19694

PCT Pub. Date: Nov. 12, 1992

[30] Foreign Application Priority Data

May 1, 1991 [GB] United Kingdom ............. 9109350

[51] Int. Cl.$^6$ ................................................. G02F 1/153
[52] U.S. Cl. ............................................ 359/272; 359/270
[58] Field of Search .................................. 359/270, 272

[56] References Cited

U.S. PATENT DOCUMENTS 4,828,369  5/1989  Hotomi ................................. 359/270
5,293,546  3/1994  Tadros et al. ........................ 359/269

FOREIGN PATENT DOCUMENTS 054587  6/1982  European Pat. Off. .
325742  8/1989  European Pat. Off. .

Primary Examiner—Georgia Y. Epps
Assistant Examiner—Thomas Robbins
Attorney, Agent, or Firm—Graham & James

[57] ABSTRACT

An electrochromic device comprises two electrodes separated by an electrolytic medium and means to permit the application of a potential between the electrodes, so as to create a circuit for charge transfer, and an electrochromic material in contact with the electrolyte and an electrode so that a change in spectral properties of the material is detectable from the exterior of the device, the electrochromic material comprising an aluminium and/or silicon containing monophthalocyanine or monotetrabenzoazaporphyrin complex.

18 Claims, 7 Drawing Sheets

ELECTROCHROMIC DEVICE

This invention relates to electrochromic devices and is particularly concerned with such devices employing phthalocyanine-based electrochromic materials.

Electrochromism is the term used to describe the phenomenon of an electrochemically-induced spectroscopic change in a material, usually a change in colour. While the phenomenon has been known for some 50 years, it is only in recent years that practical applications have become apparent, for example in visual displays, antiglare mirrors and fields where colour changing filters are of use, e.g. windows. There have been proposed for use both inorganic materials such as tungsten oxide and organic materials such as viologens. Among the organic electrochromics, rare earth bisphthalocyanines have been proposed (see for example UK Patent 2177516 and Silver et al., Display, October 1988, 174–178 and 189). Certain transition metal monophthalocyanines have also been demonstrated to be electrochromic by Collins and Schiffrin, J. Electroanal. Chem., 139, (1982), 335–369. However, extension of their investigation to a non-transition metal, i.e. the p-block element tin, resulted in a compound (dichlorophthalocyaninato tin) which showed no electrochemical activity. While dichlorophthalocyaninato tin has been subsequently reported (UK Patent 2177516) as being capable of undergoing a colour change from blue to purple at 2.5 V, it was proposed for use only as a carrier to aid sublimation of a rare earth diphthalocyanine electrochromic material and as a spacer in the crystal lattice of the deposited rare earth diphthalocyanine.

It has now surprisingly been found that the p-block elements aluminium and silicon are capable of participating in phthalocyanine complexes exhibiting electrochromicity in response to both oxidizing and reducing voltages giving interesting colour change effects which in many cases are cyclable. In view of the fact that aluminium and silicon (unlike tin and also the transition metals) exist almost exclusively in their highest oxidation states (III and IV respectively), the metals themselves cannot be expected to take part in redox processes occurring at metallophthalocyanine-modified electrodes during electrochromic reactions. That aluminium and silicon phthalocyanine complexes could contribute usefully to the spectrum of colour effects obtainable with phthalocyanine electrochromics was an unexpected but pleasing finding.

According to the present invention, there is provided an electrochromic device comprising two electrodes separated by an electrolytic medium and means to permit the application of a potential between the electrodes, so as to create a circuit for charge transfer, and an electrochromic material in contact with the electrolyte and an electrode so that a change in spectral properties of the material is detectable from the exterior of the device, the electrochromic material comprising an aluminium and/or silicon containing monophthalocyanine or monotetrabenzoazaporphyrin complex. Aluminium and silicon complexes of phthalocyanine are known—see A. B. P. Lever "The Phthalocyanines" pages 27–114 of Advances in Inorg. Chem. and Radiochem. 7, 1965.

The aluminium and/or silicon containing complex comprises aluminium and/or silicon plus phthalocyanine suitably plus at least one inorganic ligand (such as chlorine, hydroxide or oxide) or organic ligand (such as acetoxy, benzyloxy, phenoxy or an anion of an organic acid). Alternatively the complex may be a silicon-containing phthalocyanine oligomer, for example, of general formula $HO[pcSiO]_nH$ where n is, for example, from 2 to 5 and "pc" represents phthalocyanine. Yet again, the complex may be a mixed silicon/aluminiumoxyphthalocyanine, for example of general formula PcAlOSi(pc)OAlpc or PcAlOSi(pc)OSi(pc)OAlpc, which may also be in oligomeric form. While monophthalocyanine complexes are preferred because of their relatively easy preparation, it is contemplated that one or more of the bridging nitrogen atoms of the phthalocyanine may be replaced by carbon so as to give a mono-, di- or triazatetrabenzoporphyrin ring system. Substituted phthalocyanine and tetrabenzoazaporphyrin ring systems may be employed. The use of mixtures of aluminium and/or silicon containing complexes is contemplated within the scope of the invention, as is the use of mixtures of aluminium and/or silicon complexes together with other electrochromic materials such as the rare earth diphthalocyanines and viologens.

The aluminium and/or silicon containing complexes may be prepared by methods known in the art. Thus halide complexes, which may exist in different physical forms (such as differing crystalline forms of Al(pc)Cl), may be conveniently prepared by reaction of dicyanobenzene or 1,3-diiminoisoindoline with an aluminium or silicon halide in the presence of an anhydrous solvent medium such as quinoline or 1-chloronaphthalene. Preferably the reaction is carried out under reflux in an inert atmosphere shielded from direct light. The halide complexes may in the case of silicon be converted to the corresponding hydroxysilicon phthalocyanine by alkaline hydrolysis with, for example, pyridine and concentrated ammonia or sodium methoxide in 95% ethanol, while the hydroxyaluminium phthalocyanine may be prepared by reprecipitation of the chloride from concentrated sulphuric acid. The hydroxy metal phthalocyanines may then be further derivatised by reaction with organic acids and alcohols to form ethers and esters such as $Si(pc)(COOCH_3)_2$, $Si(pc)(OCH_2C_6H_5)_2$ and $Si(pc)(OC_6H_5)_2$. The hydroxy derivative may be converted by heating alone to oligomers such as $HO[pcSiO]_nH$ where n is, for example, from 2 to 5. A mixture of silicon and aluminium hydroxides may be converted by heating, for example in chloronaphthalene, to a mixed complex, for example of general formula PcAlOSi(pc)OAlpc when a ratio of 1:2 moles of silicon compound to aluminium compound is used.

While the electrodes may be of many different materials, it has been found suitable to employ as at least one electrode, glass coated with a conducting layer of indium-doped tin oxide or of gold. The second electrode may be similarly constructed or may be a simple metal electrode such as a platinium wire.

In a preferred form of the invention, the aluminium and/or silicon-containing complex is applied as a thin layer covering at least the conducting portion of the electrode. The thin layer may be applied by a variety of techniques such as spraying from solution, sublimation of the solid material under vacuum or Langmuir-Blodgett deposition. It will be appreciated by those skilled in the art that the method chosen will depend on properties such as volatility and temperature stability of the complex to be applied. Suitable thicknesses have been found to be 400 to 2000 Å, preferably between 750 and 1000 Å.

The electrolyte may be a simple liquid electrolyte such as aqueous sodium or potassium chloride. Alternatively, a solid-state electrolyte may be employed such as the perfluorosulphonic acid sold under the trade mark "Nafion" (du Pont). Such electrolytes may also be employed as liquid dispersions. However, it will be appreciated that when employing the electrochromic device, for example as a window or in an advertising display, it is advantageous to employ a solid state or semi-solid electrolyte. While the above description assumes that the electrochromic complex is deposited on one of the electrodes, it is also contemplated within the invention to include the electrochromic material in solution or dispersion within the electrolyte itself, means, such as a frit, being provided to prevent the electrochromic material from diffusing freely from one electrode to the other.

It will also be appreciated that the device depends for its usefulness on the spectroscopic change in the electrochromic material being able to be detected. The spectral change will usually be in the visible region but may also be in the infra red or ultraviolet region. Thus, if a film of colour-changing electrochromic material is used, one or both of the electrodes must allow the passage or reflection of light so that the colour change can be viewed on transmission or reflection. Indium-doped tin oxide coated glass has been found to be particularly suitable in this respect. If the electrochromic material is used in solution or dispersion, clearly at least a portion of the device container must be sufficiently light transmitting to allow viewing.

The potential between the electrodes may be supplied by any suitable means. The voltage range used will depend on the properties of the electrochromic material but it has been found satisfactory to provide a DC voltage range of from +1.5 to −1.2, preferably +1.2 V to −1 V in order to effect colour changes from a neutral form of the complex to an oxidised form and a reduced form. It has been found desirable in order to give improved life to the device, to avoid high negative voltages at the electrode surfaces.

The aluminium and/or silicon complexes described above, when used as part of an electrochromic device, have been found to exhibit visible colour changes on reduction and, in most cases, also on oxidation. It has been found generally possible to cycle the voltage, at least between the neutral and reduced states, to achieve reproducible colour changes. Typical colour changes are from cyan, blue or green in the neutral state to purple colours on reduction, or, on oxidation to a range of colours including purple/red, yellow/green and turquoise.

The invention will now be described in the following examples and with reference to the following drawings, wherein.

Preparation of Electrochromic Complexes i) Chloroaluminiumphthalocyanine (Al(pc)Cl) was prepared from aluminium trichloride and phthalonitrile in boiling quinoline as described by A. B. P. Lever, "The Phthalocyanines" pages 27–114 of Advances in Inorg. Chem. and Radiochem., 7, 1965. The material was purified by sublimation and was characterised by ir spectroscopy.

ii) Dichlorosiliconphthalocyanine (Si(pc)Cl$_2$) was prepared as described by R. D. Joyner and M. E. Kenney, Inorg. Chem., 1, 1962, 236–238. The material was characterised by ir spectroscopy.

iii) Dibenzyloxysiliconphthalocyanine (Si(pc)(OCH$_2$C$_6$H$_5$)$_2$) was prepared from dichlorosiliconphthalocyanine as described by R. D. Joyner and M. E. Kenney, Inorg. Chem., 1, 1962, 236–238 and characterised by ir spectroscopy.

iv) Diacetoxysiliconphthalocyanine (Si(pc)(OOCCH$_3$)$_2$) was prepared from dichlorosiliconphthalocyanine by repeating iii) except that benzyl alcohol was replaced by acetic acid (100 ml).

v) Diphenoxysiliconphthalocyanine (Si(pc)(OC$_6$H$_5$)$_2$) was prepared from dichlorosiliconphthalocyanine according to the method of R. D. Joyner, J. Cekada, Jr., R. G. Link and M. E. Kenney, J. Inorg. and Nuclear Chem., 15, 1960, 387–388. The material was characterised by ir spectroscopy.

vi) A phthalocyaninosiloxane polymer of general formula HO[SiO(pc)]$_n$H where n is, for example, from 2 to 5, was prepared from silicon phthalocyanine hydroxide by heating in a vacuum at 400° C. with loss of water as described by R. D. Joyner and M. E. Kenney, Chem. and Eng. News, 40, 1962, 42–44. The material was sublimed onto plates and characterised by ir spectroscopy.

vii) A mixed silicon/aluminiumoxyphthalocyanine material of general formula pcAlOSi(pc)OAlpc but believed to be in the form of an oligomer was prepared from dichlorosiliconphthalocyanine and chloroaluminiumphthalocyanine with a silicon/aluminium mole ratio of 1:2 as described by R. E. Owen and M. E. Kenney, Inorg. Chem., 1, 1962, 334–336. The material was characterised by ir spectroscopy.

Preparation of Electrochromic Electrode

Thin films (of thickness about 400 to 1500 Å) of the complexes i) to vii) described above were submlimed below red heat at about $10^{-5}$ Torr onto indium-doped tin oxide coated glass plates of size 3×1 cm and thickness 2 mm and resistance 80 ohm/square.

Determination of Electrochromic Properties

Figure 1:
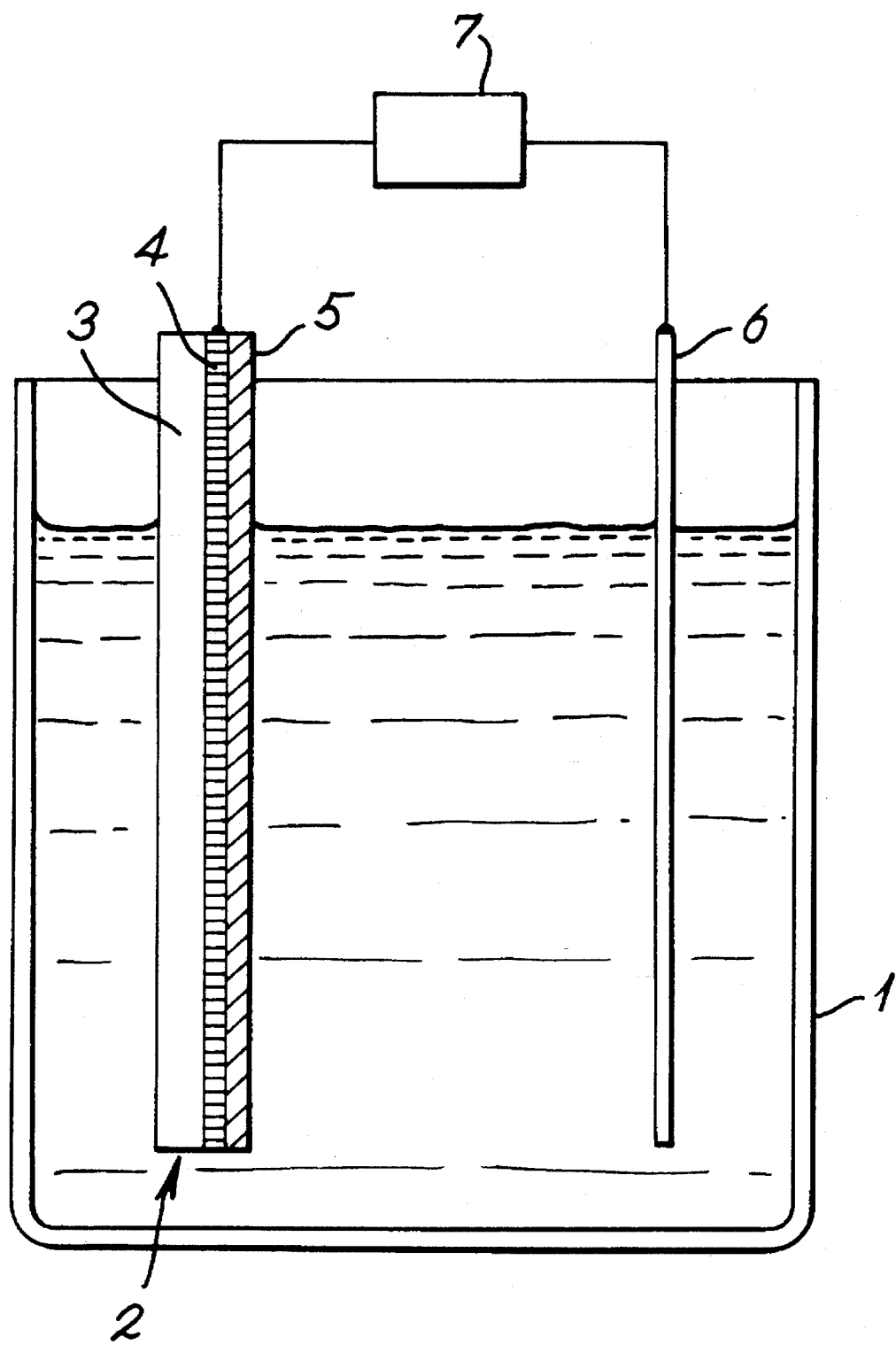
FIG. 1 is a diagram of an electrochromic cell of the type used in the examples.

The electrochromic film-coated electrodes were employed in a test apparatus diagrammatically shown in FIG. 1, in which 1 denotes a glass cuvette in which is arranged a coated electrochromic electrode as described above as first electrode 2 and consisting of glass plate 3 coated with layer 4 of indium-doped tin oxide, on which is deposited layer 5 of the electrochromic complex. A second electrode 6 is provided in the form of a platinum wire. Wire 6 and conductive layer 4 are connected via a DC voltage controller generally indicated at 7 and with an initial capability of varying the voltage from at least +9 volts to −9 volts.

The electrodes 2 and 6 were immersed in sodium chloride (concentration from 5 to 20%) as electrolyte. Alternatively, it may be more suitable to employ potassium chloride.

Colour changes for each of complexes i) to vii) were detected by eye when moving from the neutral state (no voltage applied) to the reduced state (negative voltage of about 1 V) and from the neutral state to the oxidised state (positive voltage of about 1.2 V). Also observed was the effect on neutral colour after cycling. It was observed that cyling between neutral and reduced states and between neutral and oxidised states was possible for the chloroaluminiumphthalocyanines. However, only limited cycling between neutral and oxidised states was possible for the silicon complexes.

The colour changes are reported in Table 1 below for complexes i) to vii). Complex i) was obtained in two crystalline forms with differing spectral properties, designated for convenience as α and β in the Table.

TABLE 1

| Complex | Neutral Colour | Reduced Colour | Oxidized Colour | Recycled Colour |
|---|---|---|---|---|
| α-(Al(pc)Cl) | cyan | purple | purple/red | turquoise |
| β-(Al(pc)Cl) | cyan | scarlet | purple/red | turquoise |
| $Si(pc)Cl_2$ | cyan | purple | yellow/green | blue/cyan |
| $Si(pc)OOCCH_3)_2$ | cyan | purple | yellow/green | blue/cyan |
| $Si(pc)(OCH_2C_6H_5)_2$ | green | purple | red | blue |
| $Si(pc)(OC_6H_5)_2$ | turquoise | purple | turquoise | turquoise |
| $HO[SiO(pc)]_nH$ | green | blue/purple | yellow | faded |
| pcAlOSi(pc)OAlpc | blue | purple | red | green |

Figure 2:
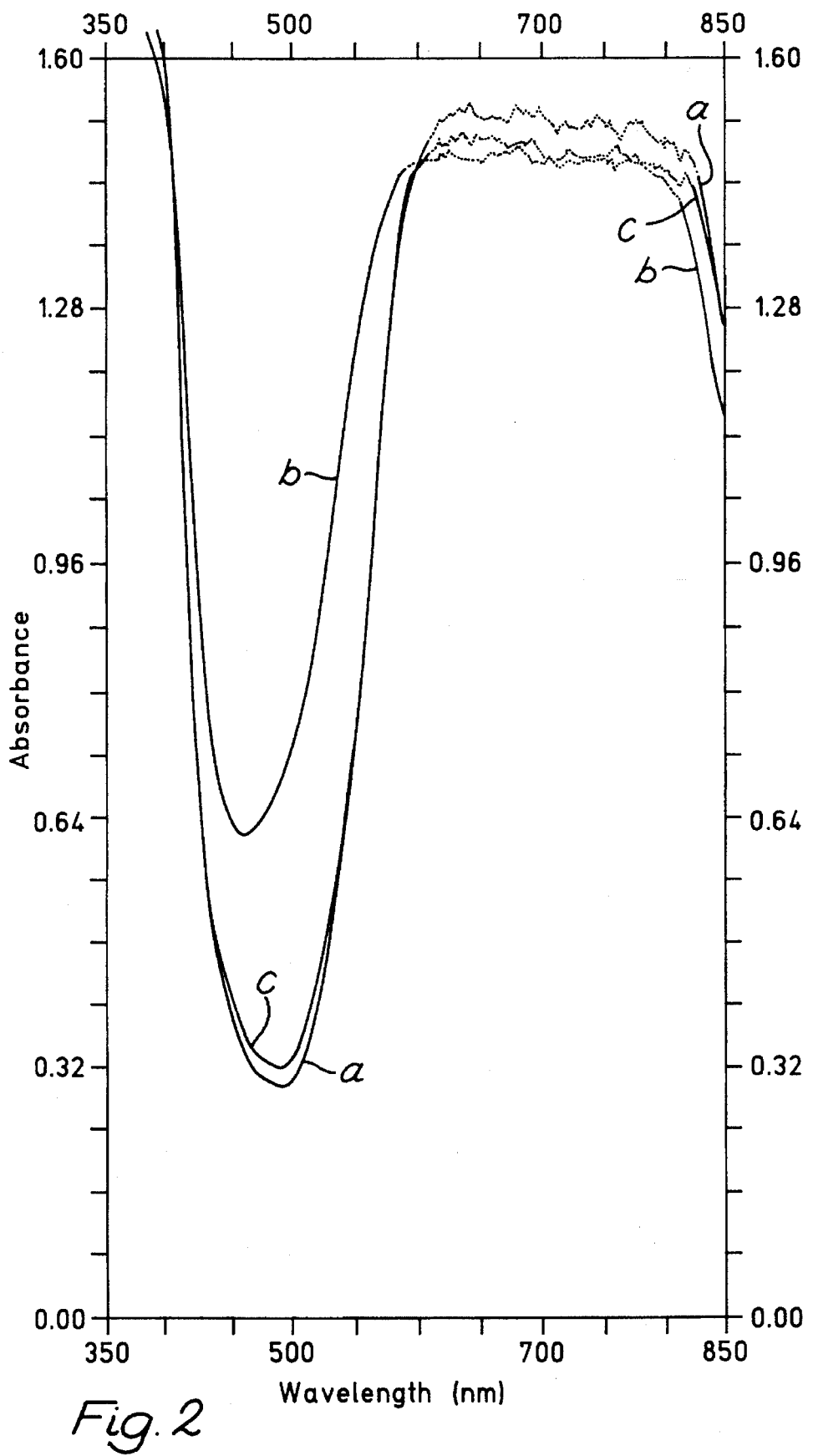
FIGS. 2 and 3 show spectral characteristics of α-chloroaluminiumphthalocyanine.
Figure 3:
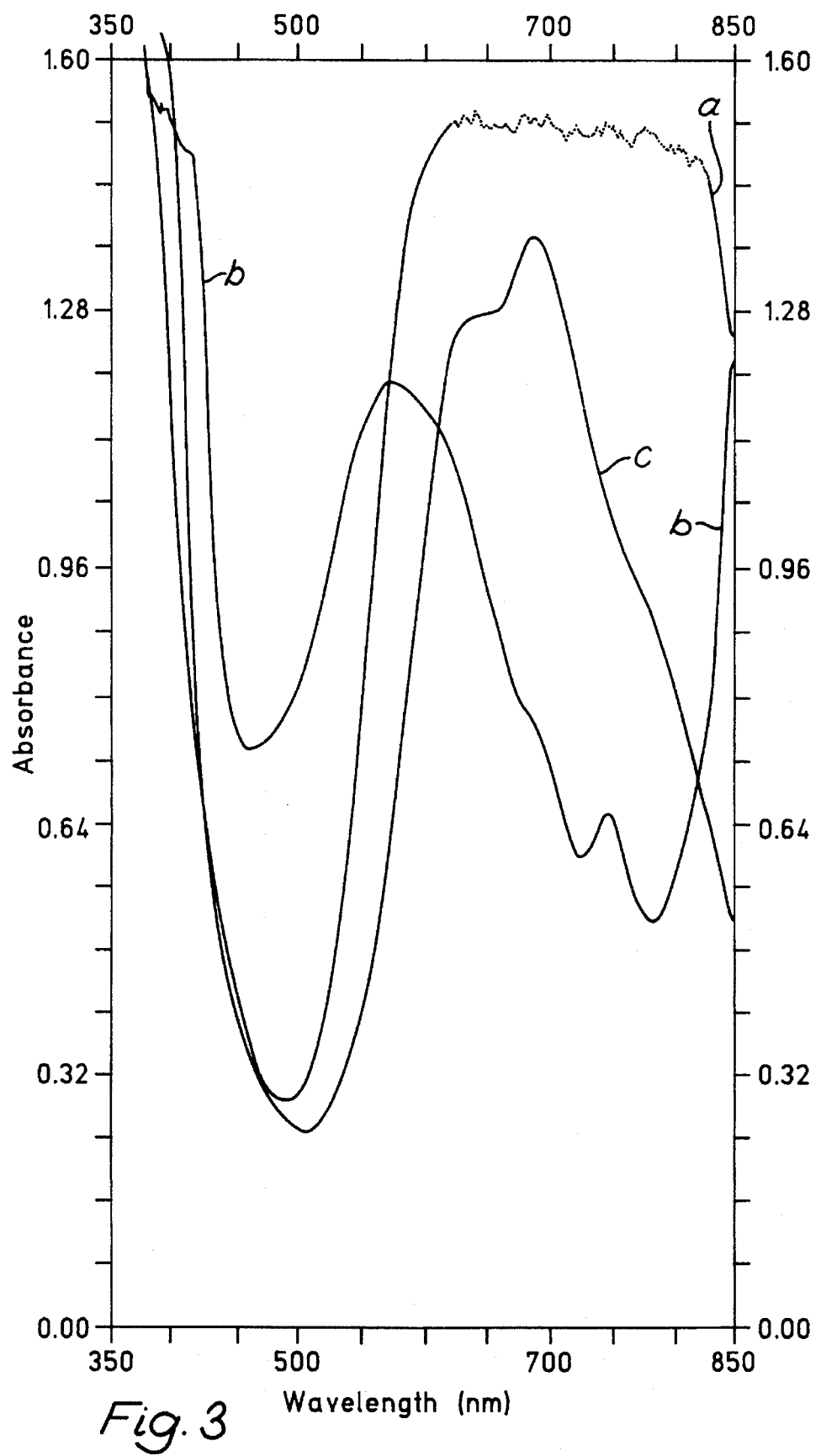
Figure 4:
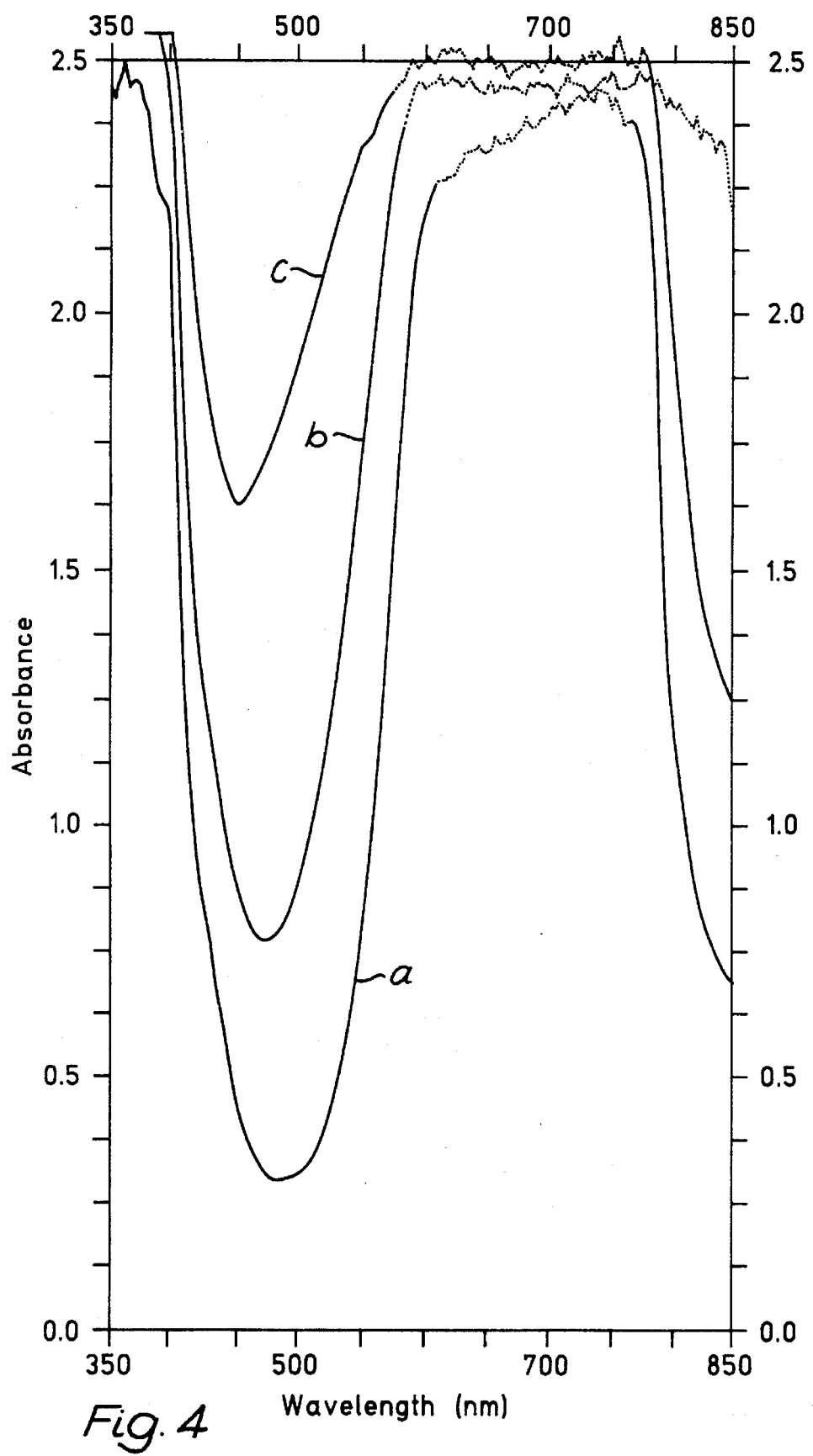
FIG. 4 shows spectral characteristics of dichlorosiliconphthalocyanine.
Figure 5:
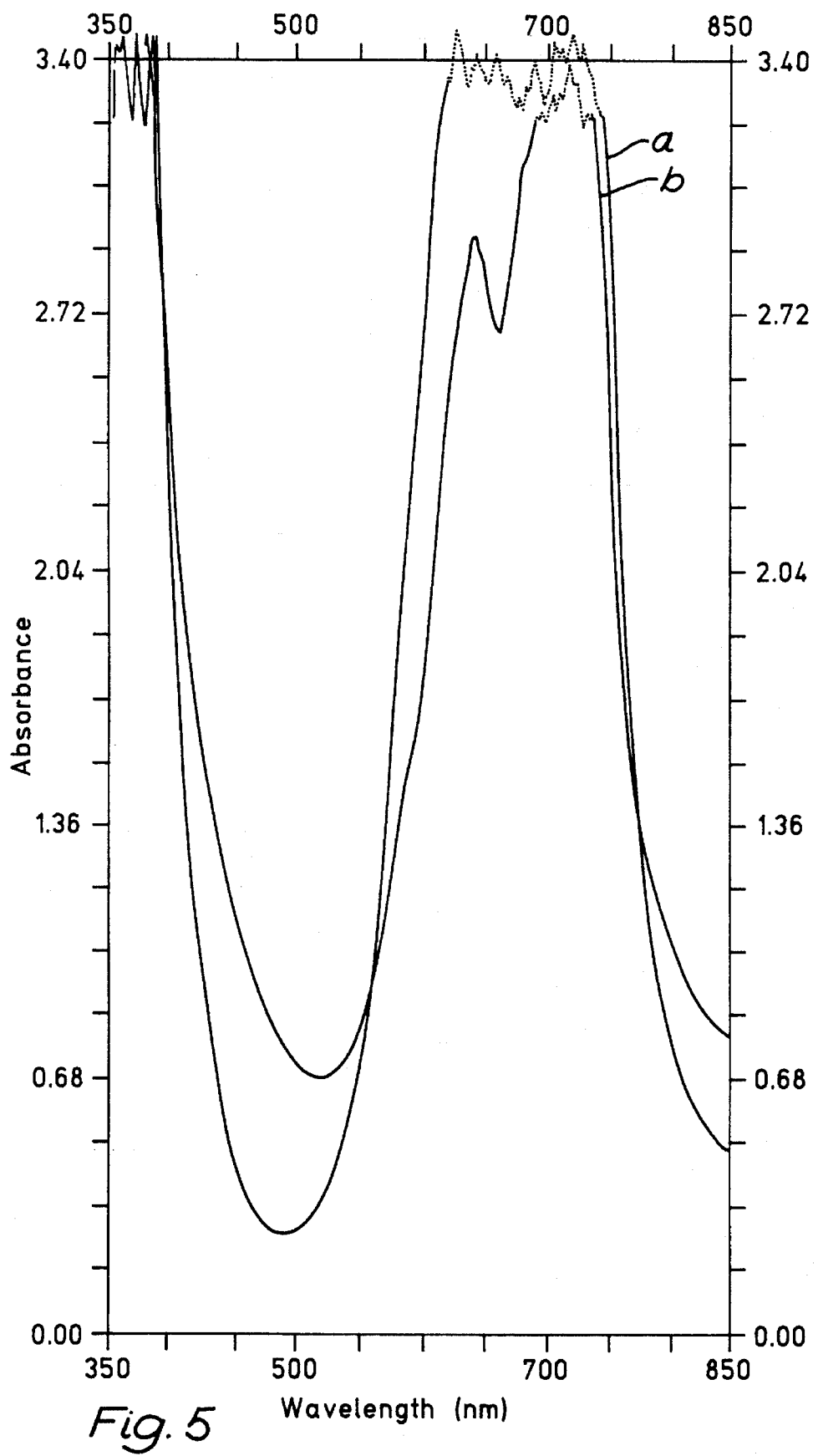
FIG. 5 shows spectral characteristics of phenoxysiliconphthalocyanine.
Figure 6:
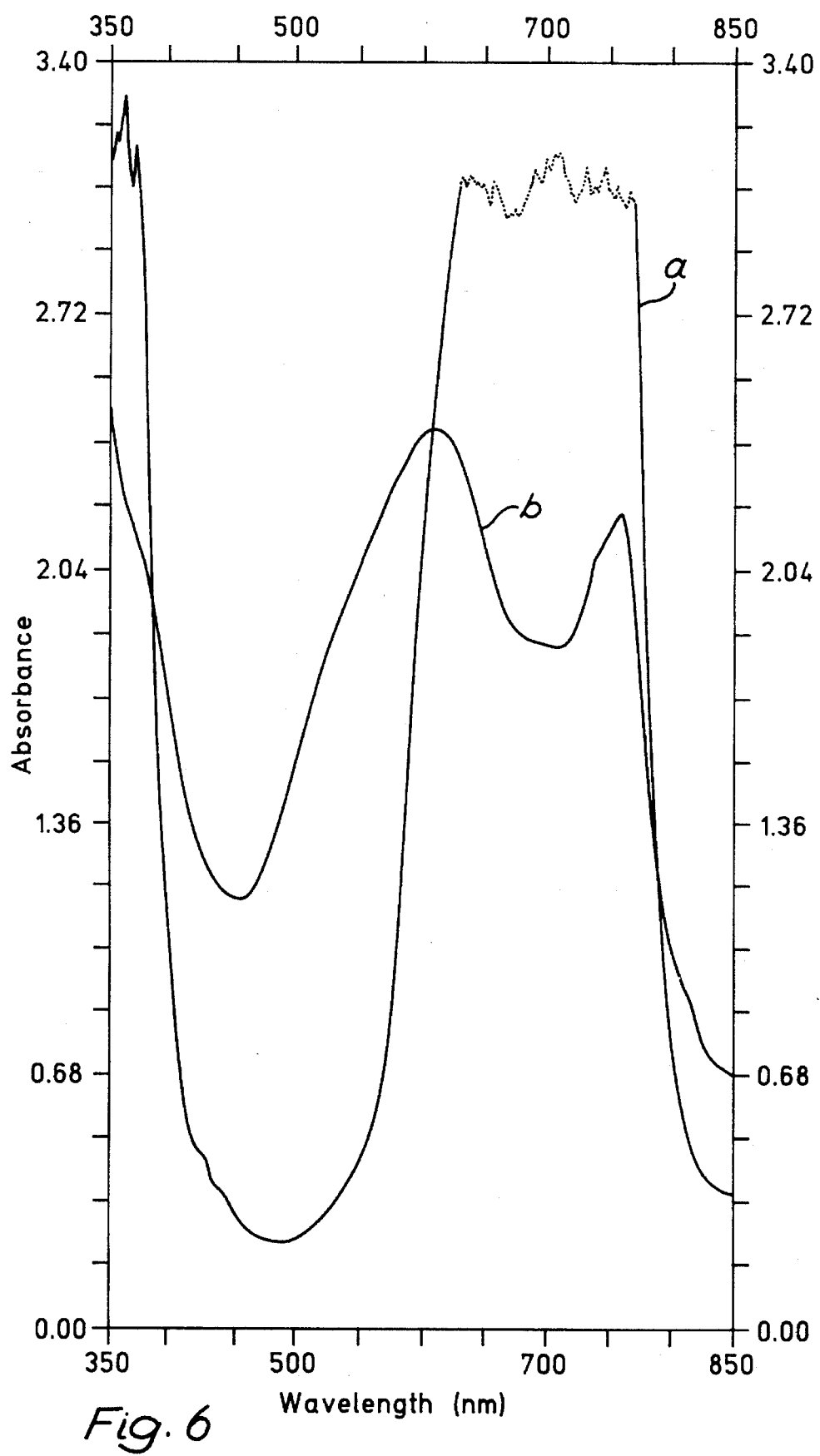
FIG. 6 shows spectral characteristics of diacetoxysiliconphthalocyanine.

Visible spectra for the different coloured states were recorded using a Perkin Elmer Lambda 5 spectrometer. The following representative spectra are given in FIGS. 2 to 7 in which fine dotted lines represent cutaway portions of the spectra:

FIG. 2: α-Al(pc)Cl in (a) neutral and (b) reduced state and (c) after recycling several times between neutral and reduced states;

FIG. 3: α-Al(pc)Cl in (a) neutral and (b) oxidised state and (c) after recycling several times between neutral and oxidized states;

FIG. 4: $Si(pc)Cl_2$ in (a) neutral and (b) reduced state and (c) after recycling between neutral and reduced states;

FIG. 5: $Si(pc)(OC_6H_5)_2$ in (a) neutral and (b) reduced state;

FIG. 6: $Si(pc)(COOCH_3)_2$ in (a) neutral and (b) reduced state; and

Figure 7:
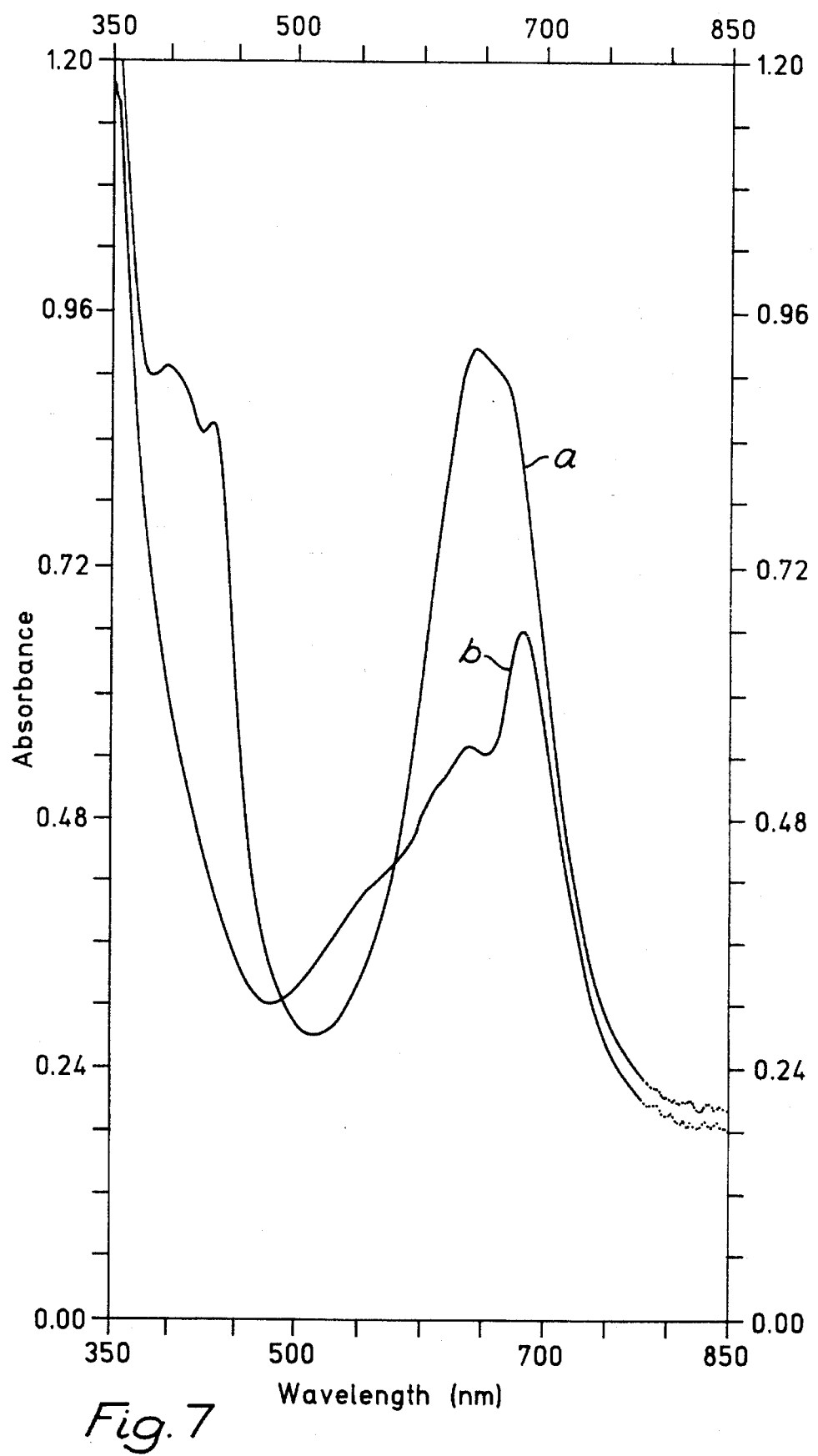
FIG. 7 shows spectral characteristics of a siliconoxyphthalocyanine oligomer.

FIG. 7: $HO[SiO(pc)]_nH$ in (a) neutral and (b) reduced form.

We claim:

1. An electrochromic device comprising two electrodes separated by an electrolytic medium and means to permit the application of a potential between the electrodes, so as to create a circuit for charge transfer, and an electrochromic material in contact with the electrolyte and an electrode so that a change in spectral properties of the material is detectable from the exterior of the device, the electrochromic material comprising an aluminium and/or silicon containing monophthalocyanine or monotetrabenzoazaporphyrin complex.

2. A device according to claim 1 wherein the said complex is a monophthalocyanine complex.

3. A device according to claim 1 wherein the said complex comprises at least one inorganic ligand selected from chlorine, hydroxide or oxide.

4. A device according to claim 1 wherein the said complex comprises at least one organic ligand selected from acyloxy, benzyloxy, aryloxy and an anion of an organic acid.

5. A device according to claim 1 wherein the said complex comprises an aluminium containing oligomer.

6. A device according to claim 1 wherein at least one of the electrodes is of glass coated with a conducting layer selected from indium-doped tin oxide and gold.

7. A device according to claim 1 wherein the aluminium containing complex is applied as a thin layer covering at least the conducting portion of an electrode.

8. A device according to claim 1 comprising a solid-state or semi-solid electrolyte.

9. A device according to claim 1 wherein the means to permit the application of a potential between the electrodes is adapted to provide a DC voltage range of from at least +1.5 to at least −1.2.

10. A device according to claim 1, wherein the electrochromic material comprises a silicon containing monophthalocyanine or monotetrabenzoazoporphyrin complex.

11. A device according to claim 10 wherein the said complex is a monophthalocyanine complex.

12. A device according to claim 10 wherein the said complex comprises at least one inorganic ligand selected from chlorine, hydroxide or oxide.

13. A device according to claim 10 wherein the said complex comprises at least one organic ligand selected from acyloxy, benzyloxy, aryloxy and an anion of an organic acid.

14. A device according to claim 10 wherein the said complex comprises a silicon containing oligomer.

15. A device according to claim 10 wherein at least one of the electrodes is of glass coated with a conducting layer selected from indium-doped tin oxide and gold.

16. A device according to claim 10 wherein the silicon containing complex is applied as a thin layer covering at least the conducting portion of an electrode.

17. A device according to claim 10 comprising a solid-state or semi-solid electrolyte.

18. A device according to claim 10 wherein the means to permit the application of a potential between the electrodes is adapted to provide a DC voltage range of from at least +1.5 to at least −1.2.

* * * * *